Nov. 11, 1958 A. D. ODELL ET AL 2,860,259
ELECTRICAL CIRCUITS EMPLOYING TRANSISTORS
Filed Nov. 26, 1954
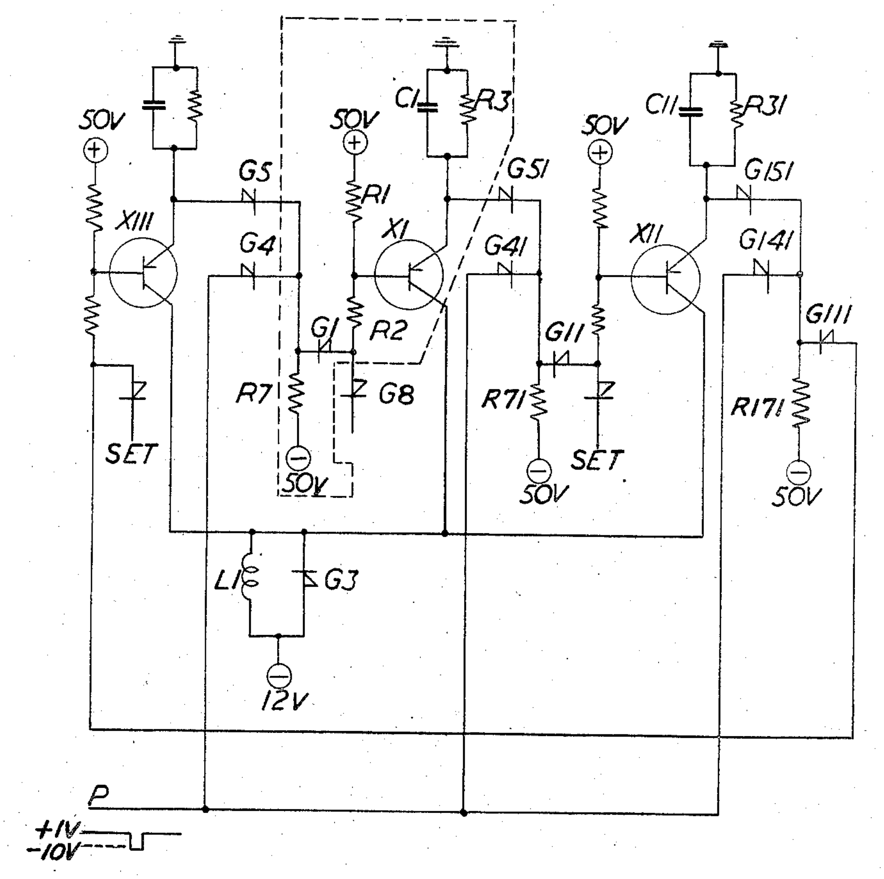
Inventor
A.D. ODELL
J. D. REYNOLDS
P.W.S. HARRILD
By Robert Harding Jr.
Attorney

United States Patent Office 2,860,259

Patented Nov. 11, 1958

2,860,259

ELECTRICAL CIRCUITS EMPLOYING TRANSISTORS

Alexander Douglas Odell, John David Reynolds, and Peter Wynne Sheridan Harrild, London, England, assignors to International Standard Electric Corporation, New York, N. Y.

Application November 26, 1954, Serial No. 471,458

Claims priority, application Great Britain December 3, 1953

5 Claims. (Cl. 307—88.5)

This invention relates to electric circuits employing crystal triodes and more particularly to a multi-stable register circuit employing a single crystal triode per stage.

According to the present invention there is provided a multi-stable register circuit comprising a single crystal triode for each stage of said circuit, each said crystal triode being so arranged as to have an "on" state and an "off" state, means controlling said crystal triodes in such a way that only one of said crystal triodes can be in its "on" state at any instant, all the others being in their "off" states, and a pulse input to each said crystal triode over which a pulse may be applied to switch the crystal triode from its "off" state to its "on" state, whereby any other crystal triode in its "on" state is automatically switched to its "off" state.

One embodiment of the invention will now be described with reference to the accompanying drawing which shows a multi-stable register.

The circuits to be described with reference to the accompanying drawing are designed to use N-type transistors in which, in the conducting condition, the emitter is biased positively and the collector biased negatively with respect to the base, but they may be made to use P-type transistors by reversing the current polarities. The transistors used in the circuits to be described also have a current gain greater than unity between the emitter and collector.

The multi-stable register illustrated in the accompanying drawing comprises essentially a number of bi-stable crystal triode stages (one of which is shown inside the dotted line) linked together by rectifiers (i. e. G5, G51 and G151). Each stage is arranged to have only an "on" condition and an "off" condition and is provided with a "set" lead which enables that stage to be switched "on" and any other stage that was "on" to be automatically switched "off." A source of master pulses P is connected to each stage enabling the register to act as a scale-of-N counter. All the potential sources indicated by "+" are on the positive side of "earth," while those indicated by "—" are on the negative side of "earth."

Each stage of the register comprises a crystal trioxide X1 (X11 and X111 in the other stages illustrated) having a current gain greater than unity. In the "on" condition, the impedance between the emitter and collector electrode is low, and in the "off" condition, the emitter-collector impedance is high. The collector electrode of the crystal triode is connected via a parallel network consisting of an inductance L1 and a rectifier G3 to —12 volts. The parallel network is common to the collector electrodes of all the crystal triodes in the register. The base electrode of the triode is connected to +50 volts through a resistor R1 and, through resistor R2, rectifier G1 and resistor R7, to —50 volts. The emitter is connected to earth through a parallel network comprising a resistor R3 and a capacitor C1.

In the "off" state, the emitter is at earth potential, while the base is held at a potential of about +6 volts by virtue of the current flowing from +50 volts, through R1, R2, G1, R7, to —50 volts. The emitter is therefore effectively negative with respect to the base. A negligible reverse current flows from base to emitter, while a small but significant current flows between base and collector. This base-collector current with negligible emitter current is a characteristic of present transistors, and to maintain a stable "off" condition, it is necessary that it shall not cause the potential of the base to approach the point at which emitter current begins to flow. This requirement can be met in practice by arranging that the resistance "seen" by the base is sufficiently low.

Consider now the effect of a negative "set" pulse applied to the base circuit X1 via the rectifier G8. The polarity of the pulse is such that G8 becomes conductive and the base of the transistor is driven negative with respect to the emitter by an amount which causes a forward current to flow between emitter and base. Since the transistor has a current gain, a regenerative action occurs in which a greater current flows out of the base to the collector than into the base from the emitter. The base is maintained negative with respect to the emitter after the "set" pulse has terminated due to current from +50 volts flowing through R1, base-collector of X1, L1 to —12 volts. Thus X1 is maintained "on" which results in a large current flow between emitter and collector. This current charges C1 and the emitter and base move negatively together until equilibrium is reached with C1 charged to approximately —10 volts which is slightly less than the —12 volts on the collector. This constitutes the "on" condition in which the collector current is the sum of the base and emitter currents. All the other stages are in their "off" condition.

The potential on the P lead is normally at +1 volt, so that rectifiers G4, G41, and G141 are conductive and the junction between G4 and R7 is held at +1 volt. Since the base and emitter electrodes of X1 are at —10 volts, both G1 and G51 are biased to their non-conductive conditions. The +1 volt also biases G5 and G151 to their non-conductive conditions.

Upon the application of a negative master pulse (—10 volts) to the wire P, rectifiers G4, G41, and G141 are biased to their non-conducting condition. This has no effect on X111, since the junction between G111 and R171 is held at substantially earth potential through the rectifier G151 which becomes conducitve for the duration of the pulse on lead P. The foregoing applies similarly to all the stages between transistors X111 and X1. At the transistor X1, rectifier G51 is non-conducting due to the —10 volts on its positive plate, so that the biasing of G41 to its non-conductive condition causes the junction between G11 and R71 to fall to —10 volts. This in turn causes the base of X11 to go negative and X11 to be switched "on" in the same way as the negative pulse applied to the "set" lead caused X1 to switch "on."

The impedance between the electrodes of X11 will now be low, but the emitter cannot immediately change its potential, due to the earth at C11, with the result that the potential on the collector rises to within a volt or two of earth. Since the collectors of X1 and X11 are commoned, the potential on the collector of X1 also rises and, provided C11 is large enough to maintain this potential for a sufficient period, X1 will be switched "off" and the voltage across C1 will rise exponentially to earth with a time-constant C1R3. If L1 is large, the current flowing through it when X1 was conductive will not change appreciably when X1 is switched "off," so that the capacitor C11 will charge at an approximately linear rate to within a few volts of the supply potential (12 volts). Due to the resonant effect of the inductor L1 and the capacitor C11, there is a tendency for the voltage on the collector to overshoot and become more negative than the negative 12 volts source. The rectifier G3, however, prevents this further negative movement.

In the same way the next negative pulse to be applied to the wire P will trigger transistor X111 to its "on" condition and transistor X11 to its "off" condition, and a negative pulse at the "set" lead of any "off" stage will switch that stage to its "on" condition and any other stage that is conducting to its "off" condition.

While the principles of the invention have been described above in connection with specific embodiments, and particular modifications thereof, it is to be clearly understood that this description is made only by way of example and not as a limitation on the scope of the invention.

What we claim is:

1. A multi-stable register circuit comprising a plurality of stages coupled together, each stage having a source of switching pulses connected thereto for selectively and independently turning each stage on, a crystal electron device having a base electrode and a pair of other electrodes in each stage, means for normally biasing the electrodes of each device so as to maintain said device in an "off" state, means for altering the biasing means associated with a device so as to cause said device to assume an "on" state, means for preventing more than one of said devices at a time from assuming the "on" state, means responsive to any one of said devices assuming its "on" state for affecting said altering means so as to cause any other of said devices which might be in its "on" state to assume its "off" state, input means connected to an electrode of each device and adapted to receive a pulse, and means responsive to a pulse received on said input means of any device to affect said altering means associated with that device to cause said triode to assume its "on" state.

2. A multi-stable register, as claimed in claim 1, further comprising means interconnecting each pair of consecutive crystal devices responsive to the first crystal device of said pair assuming its "on" state to prepare the second crystal device of said pair for operation from its "off" state to its "on" state in response to the next pulse on said common input.

3. A multi-stable register, as claimed in claim 2, wherein the electrodes of each crystal device are an emitter and a collector, the biasing means includes positive and negative voltage supply terminals, and the preparing means comprises a potential divider between said positive and negative power supply terminals and comprising a first resistor between the base electrode of the second crystal device of a pair and the positive power supply terminal, a second resistor, a first rectifier, and a third resistor in that order between said base electrode and said negative supply terminal, said first rectifier having its positive plate connected to said second resistor, said preparing means further comprising a fourth resistor in parallel with a capacitor connected between the emitter electrode of said first crystal device and earth, and a second rectifier connected between said emitter electrode and the negative terminal of said first rectifier, said second rectifier having its positive plate connected to said emitter electrode.

4. A multi-stable register, as claimed in claim 3, wherein the common pulse input to each crystal device includes the positive terminal of a fourth rectifier whose negative terminal is connected to the negative terminal of said first rectifier.

5. A multi-stable register, as claimed in claim 4, wherein the means responsive to any device assuming its "on" state for affecting the altering means so as to cause any other of the devices which might be in its "on" state to assume its "off" state comprises a network comprising an inductor and a fifth rectifier in parallel, a source of negative potential of less value than the negative power supply terminal, one terminal of said inductor being connected to said source of negative potential and the other terminal to the collector electrodes of all the crystal devices in said multi-stable register, said fifth rectifier having its positive terminal connected to said source of negative potential.

References Cited in the file of this patent

UNITED STATES PATENTS

| | | |
|---|---|---|
| 2,591,961 | Moore et al. | Apr. 8, 1952 |
| 2,594,336 | Mohr | Apr. 29, 1952 |
| 2,644,897 | Lo | July 7, 1953 |
| 2,719,250 | Six et al. | Sept. 27, 1955 |